United States Patent
Chen Johnson et al.

(10) Patent No.: US 7,100,004 B2
(45) Date of Patent: Aug. 29, 2006

(54) METHOD FOR SCRUBBING REGIONS IN CENTRAL STORAGE

(75) Inventors: Judy S. Chen Johnson, Poughkeepsie, NY (US); Kevin W. Kark, Poughkeepsie, NY (US); George C. Wellwood, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 10/818,569

(22) Filed: Apr. 6, 2004

(65) Prior Publication Data

US 2005/0240801 A1    Oct. 27, 2005

(51) Int. Cl.
*G06F 12/00* (2006.01)

(52) U.S. Cl. ............. 711/159; 711/154; 711/165; 710/68; 714/764

(58) Field of Classification Search ........... 711/154, 711/159, 165; 710/68; 714/764
See application file for complete search history.

(56) References Cited

U.S. PATENT DOCUMENTS 5,267,242 A * 11/1993 Lavallee et al. ............. 714/7
6,446,145 B1   9/2002 Har et al. ..................... 710/68
6,480,982 B1 * 11/2002 Chan et al. .................. 714/764

* cited by examiner

*Primary Examiner*—Reba I. Elmore
(74) *Attorney, Agent, or Firm*—Lynn L. Augspurger

(57) ABSTRACT

Memory is scrubbed by an improved non-linear method giving scrubbing preference to the central storage region having the characteristic of a high risk read-only memory such as the CPA region to prevent the accumulation of temporary data errors. The chip row on which the CPA resides is scrubbed after each time the scrubbing of a non-CPA chip row in a PMA completed successfully. The next non-CPA least recently scrubbed chip row would be selected for scrubbing after scrubbing completed on the CPA chip row. This in a first case provides non-linear selection methods of scrubbing central storage of computer systems to more frequently select ("select" herein encompasses the meaning of "favor") scrub regions having the characteristic of a predominately read-only memory making those regions at a higher risk of failure than those regions having lower risk because of frequent write operations. In a second case, scrub regions having the characteristic of a predominately read-only memory are selected by using a second preferred embodiment selection method which uses the detection of faulty data from normal system accesses to central storage to identify other high risk regions and scrub them before other lower risk regions. In addition, the severity of the detected data error can be used to determine the rate at which scrub commands are sent to the selected region: the higher the severity, the higher the scrub rate.

18 Claims, 4 Drawing Sheets

METHOD FOR SCRUBBING REGIONS IN CENTRAL STORAGE

TRADEMARKS

IBM® is a registered trademark of International Business Machines Corporation, Armonk, N.Y., U.S.A. S/390, Z900 and z990 and other names used herein may be registered trademarks, trademarks or product names of International Business Machines Corporation or other companies.

FIELD OF THE INVENTION

This invention is related to computers and computer systems and in particular to methods to scrubbing a high risk region of central storage to be processed for the removal of temporary errors by scrubbing the region using different scrub rates based on a risk assessment.

BACKGROUND OF THE INVENTION

Scrubbing main memory is a practice used in IBM, as in the z900 Series systems illustrated by U.S. Pat. No. 6,446,145 issued Sep. 3, 2002 illustrating linear scrubbing in the prior art.

From prior art, each of the DRAM chip row regions, comprising a Processor Memory Array (PMA) of one or more PMAs comprising a central storage, is selected for scrubbing in a linear fashion. That is, after chip row n is scrubbed, chip row n+1 is selected for scrubbing and after the last chip row is scrubbed, chip row 0 is again selected.

The scrub process begins by fetching a unit of data containing ECC words from central storage, the detection of a single bit error (CE) within the ECC word or single symbol error (two bit error from the same DRAM—also a CE) within an ECC word, the absence of multi-bit errors (two or more bit errors that span more than one symbol—UE) within any ECC word within the unit of data, and the store back of the unit of data with the temporary single bit errors or single symbol errors being corrected by the ECC correction circuitry. The region of central storage being defined as the space occupied by the ECC words contained in one row of DRAM chips.

Background scrubbing of memory cards on z900 servers is under millicode control. Every millisecond the millicode issues 8 separate operations to scrub 256 bytes per operation. It takes approximately 9.32 hours to scrub 64 Gigabytes (GB) of memory.

The operating system control program, which contains a greater percentage of read-only regions than customer storage, and which resides contiguously in the low 2 GB of storage for z900 servers, is a high risk region. In a 9.32 hour time frame, the control program area (CPA) is only scrubbed once. If the CPA memory contained temporary errors (Correctable Errors—CE's), these errors may not be corrected by stores to those read-only CPA locations. These read-only regions then depend totally on scrubbing to correct the possible temporary CE's. The concern is that these CE's may not be corrected before another CE appears in the same ECC word to result in an Uncorrectable Error (UE), and an UE in CPA is a system check-stop event.

When millicode completes scrubbing a memory chip row, or rank, millicode examines Bit Error Counters for a threshold condition (a condition where a Bit Error Counter equals or exceeds a predetermined value). There is one Bit Error Counter for each DRAM in a chip row. The same set of counters is shared by all chip rows, since each chip row is scrubbed separately. If a DRAM on that chip row has its corresponding Bit Error Counter reach the threshold condition, then millicode would attempt to replace this DRAM with a spare DRAM. The attempt is successful if the spare DRAM is not already in use and the spare DRAM is in good condition: its Bit Error Counter did not reach threshold. At this time, the memory access to that DRAM is put into Half-Spare mode. This means that the stores to the bad DRAM will also be stored to the spare DRAM and the fetches to the bad DRAM will still only come from the bad DRAM. When scrubbing is performed again for this chip row, the data in the bad DRAM would be moved over to the spare DRAM. At the end of re-scrubbing this chip row, the memory accesses to the bad DRAM will be switched to Full-Spare mode by millicode. All fetches will now come from the spare DRAM.

For z990 servers with linear scrub region selection as in prior art, it is desired that all of memory in central storage, a possible maximum of 128G per book for a maximum of 4 books, be scrubbed once within an 8-hour shift. This is to be achieved by a combination of using the z990 server's scrub command which scrubs up to 1024 bytes per PMA per operation, and sending 4 operations every 250 microseconds. The CPA area would be scrubbed once in 8.68 hours.

SUMMARY OF THE INVENTION

By employing the inventions described below, we have learned here at IBM that using risk assessment to select a scrub region and a scrub rate, the probability increases that temporary faulty data residing in central storage can be corrected before potential damage is caused to the system or that components with permanent damage can be electronically replaced (spared) and that the scrubbing methods described herein are capable of meeting objectives.

A first preferred embodiment of our invention provides non-linear selection methods of scrubbing central storage of computer systems to more frequently select ("select" herein encompasses the meaning of "favor") scrub regions having the characteristic of a predominately read-only memory making those regions at a higher risk of failure than those regions having lower risk because of frequent write operations.

In accordance with our invention, the first preferred method of selection is enhanced to modify the non-linear selection method selecting scrub regions having the characteristic of a predominately read-only memory, by using a second preferred embodiment selection method which uses the detection of faulty data from normal system accesses to central storage to identify other high risk regions and scrub them before other lower risk regions. Sometimes, in the second preferred embodiment of the method, in addition, the severity of the detected data error would be used determine the rate at which scrub commands are sent to the selected region: the higher the severity, the higher the scrub rate.

For a fuller understanding of the inventions, reference should be made to the detailed description which follows.

TABLES AND DRAWINGS ILLUSTRATING THE INVENTION

Additional features and advantages are realized through the techniques of the present invention. Other embodiments and aspects of the invention are described in detail herein and are considered a part of the claimed invention. For a better understanding of the invention with advantages and features, refer to the description and to the tables and drawings.

BRIEF DESCRIPTION OF THE TABLES AND DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying Tables and drawings in which:

Table 1 illustrates the 16 possible combinations for the current and previous UE and CE indicators for a chip row.

Table 2 illustrates the 16 possible combinations for the current and previous UE and CE indicators for a chip row.

Table 3 illustrates the 16 possible combinations for the current and previous UE and CE indicators for a chip row.

Table 4 illustrates the 16 possible combinations for the current and previous UE and CE indicators for a chip row in columns 1 through 4 after scrubbing all addresses has completed.

Figure 1:
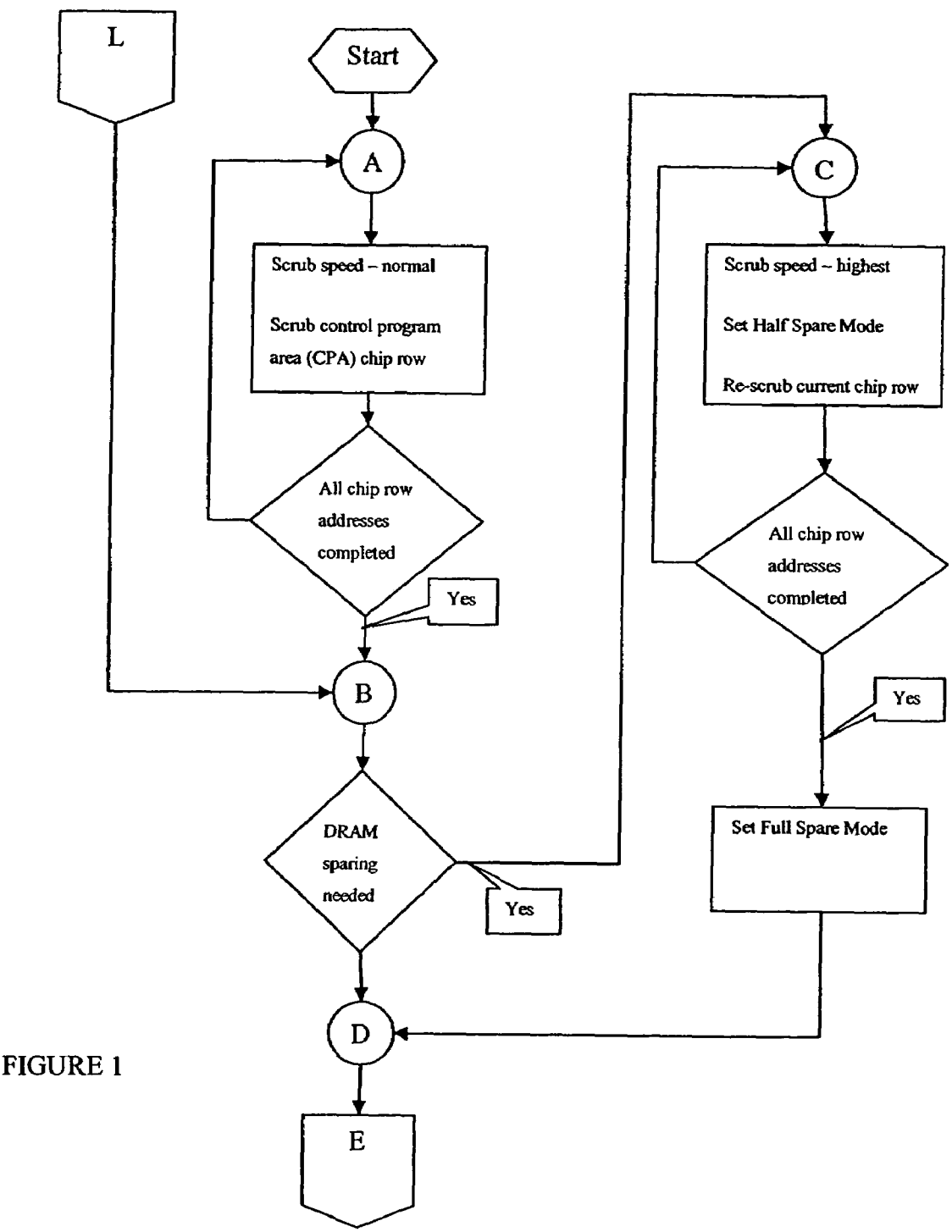
FIG. 1 shows the steps for beginning the preferred embodiment method 1 for scrubbing central storage in a non-linear fashion favoring the CPA region.

The detailed description explains the preferred embodiments of the invention, together with advantages and features, by way of example with reference to the drawings.

DETAILED DESCRIPTION OF THE INVENTION

In accordance with our preferred embodiment, we have achieved our improvements by giving scrubbing preference to the central storage region having the characteristic of a high risk read-only memory and this prevents the accumulation of temporary data errors. The control program area (CPA) is such a region in central storage given preference. The chip row on which the CPA resides is scrubbed after each time the scrubbing of a non-CPA chip row in a PMA completed successfully. The next non-CPA least recently scrubbed chip row is selected for scrubbing after scrubbing completed on the CPA chip row.

Further, by adding hardware monitor indicators, for each chip row configured in central storage, which monitor and are connected to the customary data error detection logic where the data error detection logic monitors all fetch accesses to central storage. There are assigned specifically two sets of indicators (one CE hold latch and 1 UE hold latch per set) for each chip row. These indicators are used to further identify regions of central storage needing greater scrubbing focus in an effort to prevent a UE occurrence by correcting a temporary data error or by sparing a faulty DRAM before a system access is made from which the system might not be able to recover. The first set of indicators for each chip row would hold the current status and the second set would hold the previous status with the second set taking on the value of the first set when all locations within the current chip row being scrubbed have been completed.

Any time a CE or UE is detected, the appropriate CE or UE indicator for the chip row associated with the address of the ECC word with the error would be set. When scrubbing has been completed for a chip row and the next chip row is to be selected for scrubbing, the previous and current chip row indicators for all chips rows, except the chip row where scrubbing just finished, are examined for a new data error condition indicating needed scrubbing. That is, should the previous indicators for a chip row have been CE=0 and UE=0 and the current indicators be CE=1 or UE=1, that would indicate a need for scrubbing. In addition to a chip row needing scrubbing, the need would be more severe in the case of the UE relative to the CE. The severity of the detected data error determines the next scrub region.

In accordance with our method, the severity of the detected data error also determines the scrub speed. The selected chip row is scrubbed more quickly when the need is more severe than if the need was less severe. Four scrub speeds are provided to cover the four severities in increasing severity order of 1) no new data error condition—normal speed, 2) new CE detected—high speed, 3) new UE detected—higher speed, and 4) Half Spare mode—highest speed.

Turning now to our inventions in greater detail, it should be understood that the capabilities of the present invention can be implemented in software and or firmware in combination with server hardware.

For servers of our preferred embodiment as illustrated by the Figures, scrubbing favor (method 1 is our first preferred embodiment) as illustrated in the steps of FIG. 1 would be given to the region of central storage having the characteristic of a high risk read-only memory, because of the potential accumulation of temporary errors. The control program area determined the area for scrubbing in FIG. 1, preferably the CPA region as this region would have this type of characteristic. The chip row on which the CPA resides would be scrubbed after each time the scrubbing of a non-CPA chip row in a PMA completed successfully. The next non-CPA least recently scrubbed chip row would be selected for scrubbing after scrubbing completed on the CPA chip row. The chip row order would be CPA (normally chip row 0), chip row 1, CPA, chip row 2, CPA, chip row 3, CPA, chip row 1, etc. for regular scrubbing with no DRAM sparing. The entire memory would be scrubbed in 16.2 hours with the CPA region being scrubbed every 1.08 hours. This represents, it will be noted, a significant advance.

When it has been determined that DRAM sparing is required at the completion of scrubbing a chip row because a Bit Error Counter reached threshold, the same chip row will be re-scrubbed in Half-Spare mode to move data from the faulty DRAM to the spare DRAM. Because data are still being fetched from the faulty DRAM during this time, the scrubbing rate is increased to the highest speed to complete the data move as quickly as possible to minimize the system exposure to a potential UE. After the chip row has been re-scrubbed in Half Spare mode, the mode is set to Full Spare mode with future fetch accesses coming from the spare DRAM. As an example for a computer system with n chip rows and a sparing event, the chip row order would be CPA, 1, CPA, 2, 2, CPA, n, CPA, 1, etc. with the re-scrubbing of chip row 2 after sparing a DRAM in chip row 2.

Method 1 representing the preferred embodiment can be altered to provide even more coverage over time by scrubbing the CPA chip row multiple times before scrubbing a non-CPA chip row. For example, to provide 90% scrub coverage over time of the CPA area, the chip row order can be CPA, CPA, CPA, CPA, CPA, CPA, CPA, CPA, CPA, 1, CPA, CPA, CPA, CPA, CPA, CPA, CPA, CPA, CPA, 2, CPA (9 times), n, CPA (9 times), 1, etc.

Figure 2:
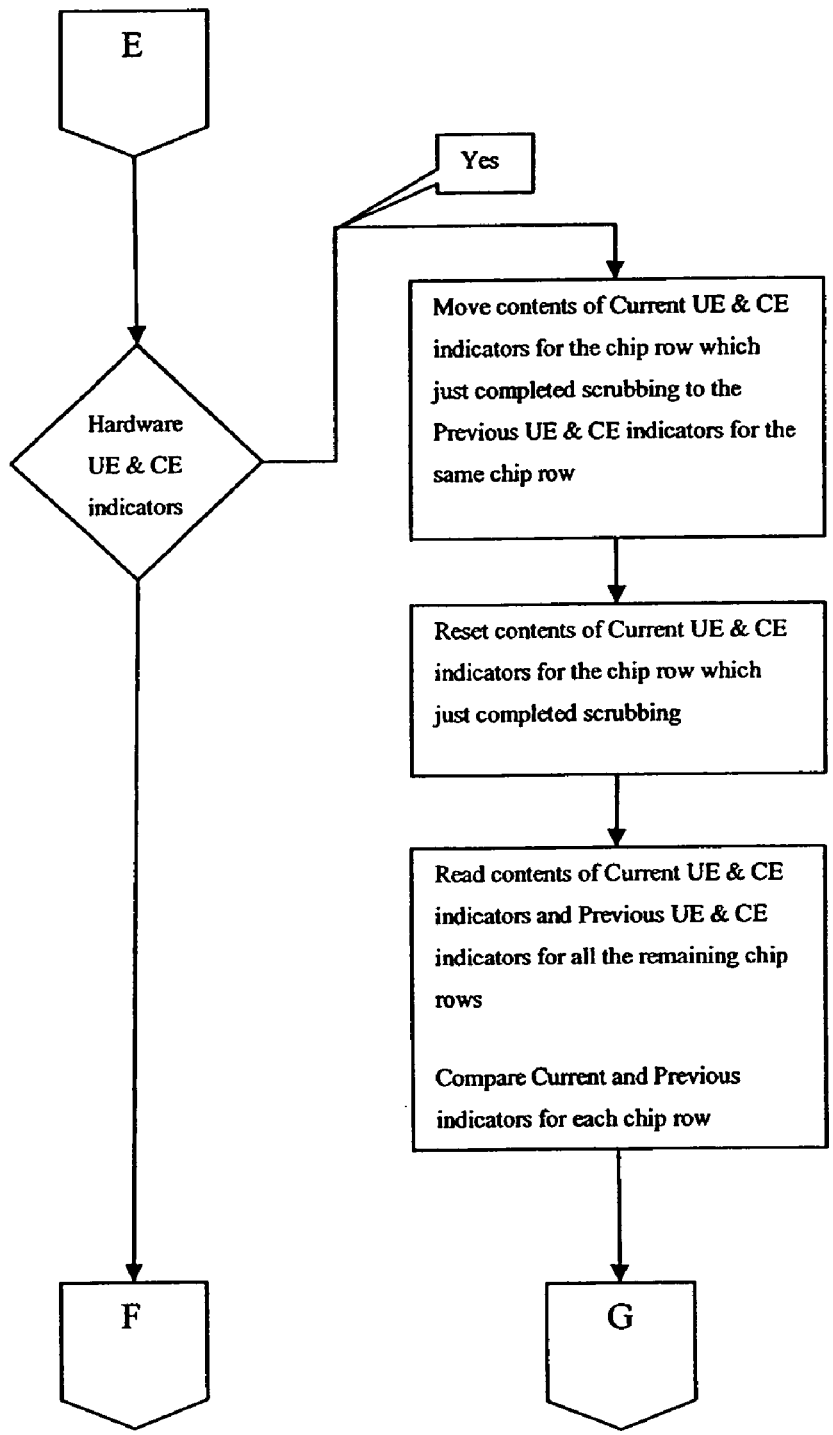
FIG. 2 shows the steps for beginning the second preferred embodiment method 2 for central storage.

As illustrated by FIG. 2, central storage memory controllers have fetch CE and UE detection logic that is used for normal system operations as well as scrub operations. The detection logic monitors the data being returned from central storage.

For method 2 (our second preferred embodiment) on computer systems with added hardware monitor indicators, there would be 2 sets of indicators (one CE hold latch and 1 UE hold latch per set), connected to the detection logic, for each chip row configured in central storage. These indicators would be used to further identify regions of central storage needing greater scrubbing focus in an effort to prevent a UE occurrence by correcting a temporary CE or by sparing a faulty DRAM before a system access is made from which the system might not be able to recover. The first set of indicators for each chip row would hold the current status and the second set would hold the previous status with the second set taking on the value of the first set when all locations within the current chip row being scrubbed were completed. At the same time the first set for the completed chip row would be reset.

Any time a CE or UE is detected, the appropriate CE or UE indicator for the chip row associated with the address of the ECC word with the error would be set. When scrubbing has been completed for a chip row and the next chip row is to be selected for scrubbing, the previous and current chip row indicators for all chips rows, except the chip row where scrubbing just finished, would be examined for a new data error condition. That is, as an example, should the previous indicators for a chip row have been CE=0 and UE=0 and the current indicators be CE=1 or UE=1, that would indicate a need for scrubbing. In addition to a chip row needing scrubbing, the need would be more severe in the case of the UE relative to the CE and a CE relative to no error. The severity of the detected data error determines the next scrub region.

Figure 3:
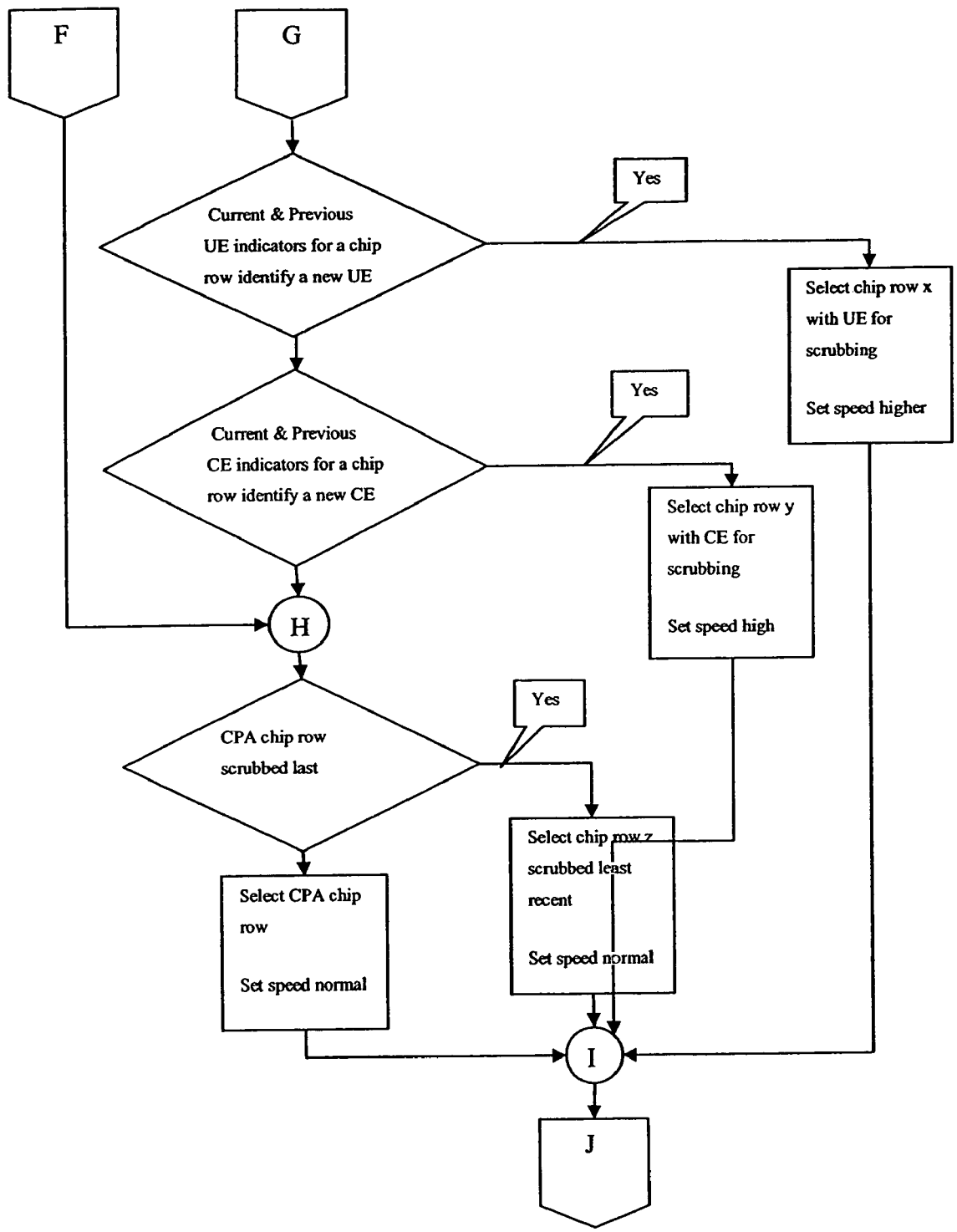
FIG. 3 shows the steps taking the output of FIG. 2 and scrubbing the CPA rows, with additional steps that can be taken.
Figure 4:
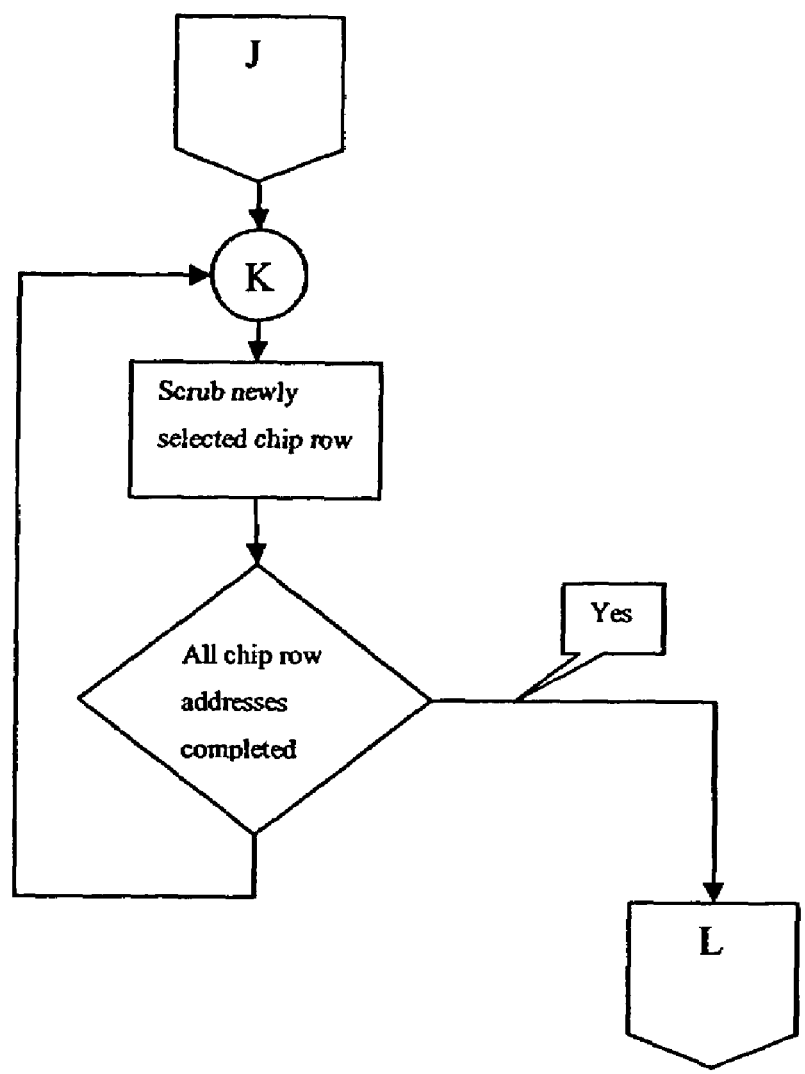
FIG. 4 shows the steps used in scrubbing successively all chip rows to return to a ready state for starting the preferred embodiment process begun in the steps shown in FIG. 1.

As illustrated by FIG. 3, the severity of the detected data error also determines the scrub speed. The selected chip row is scrubbed more quickly when the need is more severe than if the need was less severe. Four scrub speeds would cover the 4 severities in increasing severity order of 1) no new data error condition—normal speed, 2) new CE detected—high speed, 3) new UE detected—higher speed, and 4) Half Spare mode—highest speed.

Refer to the tables in the following section for the complete definition of the selection logic and the next state logic.

Table 1 illustrates the 16 possible combinations for the current and previous UE and CE indicators for a chip row. A '1' in column 5 points to a set of status conditions where a new UE has been recorded where previously none existed.

TABLE 1

| Current UE Status | Previous UE Status | Current CE Status | Previous CE Status | New UE Detected |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 0 |
| 0 | 1 | 0 | 1 | 0 |
| 0 | 1 | 1 | 0 | 0 |
| 0 | 1 | 1 | 1 | 0 |
| 1 | 0 | 0 | 0 | 1 |
| 1 | 0 | 0 | 1 | 1 |
| 1 | 0 | 1 | 0 | 1 |
| 1 | 0 | 1 | 1 | 1 |
| 1 | 1 | 0 | 0 | 0 |
| 1 | 1 | 0 | 1 | 0 |
| 1 | 1 | 1 | 0 | 0 |
| 1 | 1 | 1 | 1 | 0 |

Table 2 illustrates the 16 possible combinations for the current and previous UE and CE indicators for a chip row. A '1' in column 5 points to a set of status conditions where a new CE has been recorded where previously none existed and no new UE has been recorded.

TABLE 2

| Current UE Status | Previous UE Status | Current CE Status | Previous CE Status | New CE Detected w/no New UE |
|---|---|---|---|---|
| 0 | 0 | 0 | 0 | 0 |
| 0 | 0 | 0 | 1 | 0 |
| 0 | 0 | 1 | 0 | 1 |
| 0 | 0 | 1 | 1 | 0 |
| 0 | 1 | 0 | 0 | 0 |
| 0 | 1 | 0 | 1 | 0 |
| 0 | 1 | 1 | 0 | 1 |
| 0 | 1 | 1 | 1 | 0 |
| 1 | 0 | 0 | 0 | 0 |
| 1 | 0 | 0 | 1 | 0 |
| 1 | 0 | 1 | 0 | 0 |
| 1 | 0 | 1 | 1 | 0 |
| 1 | 1 | 0 | 0 | 0 |
| 1 | 1 | 0 | 1 | 0 |
| 1 | 1 | 1 | 0 | 1 |
| 1 | 1 | 1 | 1 | 0 |

Table 3 illustrates the 16 possible combinations for the current and previous UE and CE indicators for a chip row. A '1' in column 5 points to a set of status conditions where there is no new UE and no new CE recorded.

TABLE 3

| Current UE Status | Previous UE Status | Current CE Status | Previous CE Status | Static Condition No New UE No New CE |
|---|---|---|---|---|
| 0 | 0 | 0 | 0 | 1 |
| 0 | 0 | 0 | 1 | 1 |
| 0 | 0 | 1 | 0 | 0 |
| 0 | 0 | 1 | 1 | 1 |
| 0 | 1 | 0 | 0 | 1 |
| 0 | 1 | 0 | 1 | 1 |
| 0 | 1 | 1 | 0 | 0 |
| 0 | 1 | 1 | 1 | 1 |
| 1 | 0 | 0 | 0 | 0 |
| 1 | 0 | 0 | 1 | 0 |
| 1 | 0 | 1 | 0 | 0 |
| 1 | 0 | 1 | 1 | 0 |
| 1 | 1 | 0 | 0 | 1 |
| 1 | 1 | 0 | 1 | 1 |
| 1 | 1 | 1 | 0 | 0 |
| 1 | 1 | 1 | 1 | 1 |

Table 4 illustrates the 16 possible combinations for the current and previous UE and CE indicators for a chip row in columns 1 through 4 after scrubbing all addresses has completed. The current status in columns 1 and 3 are pushed (moved) into the status indicators holding the next state of the previous status indicators as seen in columns 7 and 9 with the next state of the current status indicators now being reset as seen in columns 6 and 8.

TABLE 4

| Current UE indicator after scrub completes chip row | Previous UE indicator after scrub completes chip row | Current CE indicator after scrub completes chip row | Previous UE indicator after scrub completes chip row | Next state - Current UE indicator after push down and reset | Next state - Previous UE indicator after push down | Next state - Current CE indicator after push down and reset | Next state - Previous CE indicator after push down |
|---|---|---|---|---|---|---|---|
| 0 | 0 | 0 | 0 | 0 | 0 | 0 | 0 |
| 0 | 0 | 0 | 1 | 0 | 0 | 0 | 0 |
| 0 | 0 | 1 | 0 | 0 | 0 | 0 | 1 |
| 0 | 0 | 1 | 1 | 0 | 0 | 0 | 1 |
| 0 | 1 | 0 | 0 | 0 | 0 | 0 | 0 |
| 0 | 1 | 0 | 1 | 0 | 0 | 0 | 0 |
| 0 | 1 | 1 | 0 | 0 | 0 | 0 | 1 |
| 0 | 1 | 1 | 1 | 0 | 0 | 0 | 1 |
| 1 | 0 | 0 | 0 | 0 | 1 | 0 | 0 |
| 1 | 0 | 0 | 1 | 0 | 1 | 0 | 0 |
| 1 | 0 | 1 | 0 | 0 | 1 | 0 | 1 |
| 1 | 0 | 1 | 1 | 0 | 1 | 0 | 1 |
| 1 | 1 | 0 | 0 | 0 | 1 | 0 | 0 |
| 1 | 1 | 0 | 1 | 0 | 1 | 0 | 0 |
| 1 | 1 | 1 | 0 | 0 | 1 | 0 | 1 |
| 1 | 1 | 1 | 1 | 0 | 1 | 0 | 1 |

Further details of the flow utilized by the methods of the preferred embodiments are specified explicitly by the steps set forth in the FIGS. 1, 2, 3 and 4. A review of the detailed steps there shown is self explanatory. These steps can be controlled by software, microcode or firmware in combination with the server's hardware.

While the preferred embodiment to the invention has been described, it will be understood that those skilled in the art, both now and in the future, may make various improvements and enhancements which fall within the scope of the claims which follow. The flow diagrams depicted herein are examples of the preferred embodiment. There may be many variations to these diagrams or the steps (or operations) described therein without departing from the spirit of the invention. For instance, the steps may be performed in a differing order, or steps may be added, deleted or modified consistent with the detailed description herein, as may occur to those skilled in the art both now and in the future. All of these variations are considered a part of the claimed invention. These claims should be construed to maintain the proper protection for the invention first described.

What is claimed is:

1. A method for scrubbing regions in central storage of a computer system, comprising the steps of: successively scrubbing newly selected storage chip rows of a Processor Memory Array (PMA) and proceeding first with selection for scrubbing preference given to scrubbing a central storage region having the characteristic selected by a nonlinear selection of the scrub region to be first scrubbed.

2. The method according to claim 1 wherein the nonlinear selection criteria determines a characteristic region to be first scrubbed is a high risk read-only memory region and the process proceeds to scrub chip rows successively first in the selected region given scrubbing preference to prevent the accumulation of temporary data errors to scrub the Processor Memory Array.

3. The method according to claim 1 wherein the region of selected preference is determined to be a control program area (CPA) for the preferred the preferred central storage region.

4. The method according to claim 3 wherein the chip row on which the CPA resides is scrubbed after each time the scrubbing of a non-CPA chip row in a Processor Memory Array (PMA) completed successfully.

5. The method according to claim 4 wherein after scrubbing the CPA chip row on which the CPA resides, the next non-CPA least recently scrubbed chip row is selected for scrubbing.

6. The method according to claim 1 wherein, with hardware monitor indicators for each chip row configured in central storage connected to the customary data error detection logic said data error detection logic monitors all fetch accesses to central storage.

7. The method according to claim 6 wherein there are two sets of hardware monitor indicators (one CE hold latch and 1 UE hold latch per set) for each chip row.

8. The method according to claim 6 wherein there are sets of hardware monitor indicators for each row, each set having a CE hold latch and a UE hold latch.

9. The method according to claim 8 wherein said hardware monitor indicators are used to further identify regions of central storage needing greater scrubbing focus in an effort to prevent a UE occurrence by correcting a temporary data error or by sparing a faulty DRAM of said Processor Memory Array (PMA) before a system access is made from which the system might not be able to recover.

10. The method according to claim 7 wherein a first of said set of hardware monitor indicators for each chip row would hold the current status and a second set would hold the previous status with the second set taking on the value of the first set when all locations within the current chip row being scrubbed is completed.

11. The method according to claim 8 wherein any time a CE or UE is detected for an ECC word with an error then an appropriate CE or UE hardware monitor indicator for the chip row associated with the address of the ECC word with the error will be set.

12. The method according to claim 11 wherein when scrubbing has been completed for a chip row and the next chip row is to be selected for scrubbing, the previous and current chip row indicators for all chips rows, except the chip row where scrubbing just finished, are successively examined for a new data error condition.

13. The method according to claim 12 wherein should the previous indicators for a chip row have been CE=0 and UE=0 and the current indicators be CE=1 or UE=1, such values indicate a need for scrubbing.

14. The method according to claim 13, wherein, in addition to a chip row needing scrubbing, a UE error would be favored for selection for first scrubbing over a case of UE error condition of equal severity.

15. The method according to claim 1 wherein hardware monitor indicators indicate a level of severity of a detected data error and the severity of the detected data error determines the next scrub region.

16. The method according to claim 15 wherein the severity of the detected data error also determines the scrub speed.

17. The method according to claim 16 wherein the selected chip row is scrubbed more quickly when the need is more severe than if the need were less severe.

18. The method according to claim 17 wherein four scrub speeds may indicate four severities in increasing severity order:

(1) no new data error condition—normal speed;
(2) new CE detected—high speed;
(3) new UE detected—higher speed; and
(4) Half Spare mode—highest speed.

* * * * *